(12) United States Patent
Guidetti et al.

(10) Patent No.: US 7,032,736 B2
(45) Date of Patent: Apr. 25, 2006

(54) DEVICE FOR CONVEYING PRODUCTS, PARTICULARLY FOR AUTOMATIC PACKAGING MACHINERY, AND CORRESPONDING METHOD OF USE

(75) Inventors: Dario Guidetti, Grignasco (IT); Duilio Pavese, Bornate di Serravalle Sesia (IT)

(73) Assignee: Cavanna S.p.A., Prato Sesia (IT)

( * ) Notice: Subject to any disclaimer, the term of this patent is extended or adjusted under 35 U.S.C. 154(b) by 63 days.

(21) Appl. No.: 10/799,287

(22) Filed: Mar. 12, 2004

(65) Prior Publication Data

US 2004/0182684 A1  Sep. 23, 2004

(30) Foreign Application Priority Data

Mar. 19, 2003 (EP) .................................. 03425169

(51) Int. Cl.
*B65G 1/00* (2006.01)

(52) U.S. Cl. ................................ 198/347.1; 198/781.06

(58) Field of Classification Search .. 198/347.1–347.3, 198/781.06
See application file for complete search history.

(56) References Cited

U.S. PATENT DOCUMENTS

| | | | | | |
|---|---|---|---|---|---|
| 4,273,234 | A | * | 6/1981 | Bourgeois | ................ 198/347.3 |
| 4,499,987 | A | * | 2/1985 | Long | ........................ 198/347.3 |
| 5,285,887 | A | | 2/1994 | Hall | ............................ 198/460 |
| 5,339,942 | A | | 8/1994 | Gasser et al. | ............ 198/347.1 |
| 5,456,347 | A | | 10/1995 | Best et al. | ............. 198/781.06 |
| 6,047,812 | A | * | 4/2000 | Horn et al. | ............ 198/781.06 |
| 6,315,104 | B1 | * | 11/2001 | Ebert | ....................... 198/460.1 |
| 6,378,694 | B1 | | 4/2002 | Onoyama et al. | ...... 198/781.06 |
| 6,460,683 | B1 | * | 10/2002 | Pfeiffer | .................... 198/460.1 |
| 6,640,960 | B1 | * | 11/2003 | Spettl | ..................... 198/347.1 |

FOREIGN PATENT DOCUMENTS

| | | |
|---|---|---|
| EP | 0 534 902 A1 | 3/1993 |
| EP | 0 565 098 A1 | 10/1993 |
| FR | 2 176 324 | 10/1973 |
| FR | 2 424 705 | 11/1979 |
| FR | 2 521 110 | 8/1983 |
| GB | 2 217 170 A | 10/1989 |
| GB | 2 336 824 A | 11/1999 |

* cited by examiner

*Primary Examiner*—Gene C. Crawford
*Assistant Examiner*—Mark A. Deuble
(74) *Attorney, Agent, or Firm*—Seed IP Law Group PLLC

(57) ABSTRACT

A device for conveying articles having an array of rollers set alongside one another so as to define, by means of homologous generatrices, a plane of conveyance of said articles. A plurality of motor-driven units for said rollers, each motor-driven unit being able to bring about rotation of at least one respective roller of said array. A control unit, which acts on said motor-driven units and is able to control said motor-driven units with a speed that is selectively determined in such a way that the rollers of the array are divided into a first set of rollers, which move at at least one first speed, and at least one second set of rollers, which move at at least one second speed. Said sets of rollers are contiguous to one another along an ideal demarcation line and, by intervening on the respective motor-driven units, the control unit is able to displace selectively the aforesaid ideal demarcation line in the direction of advance of the articles on the array of rollers.

8 Claims, 2 Drawing Sheets

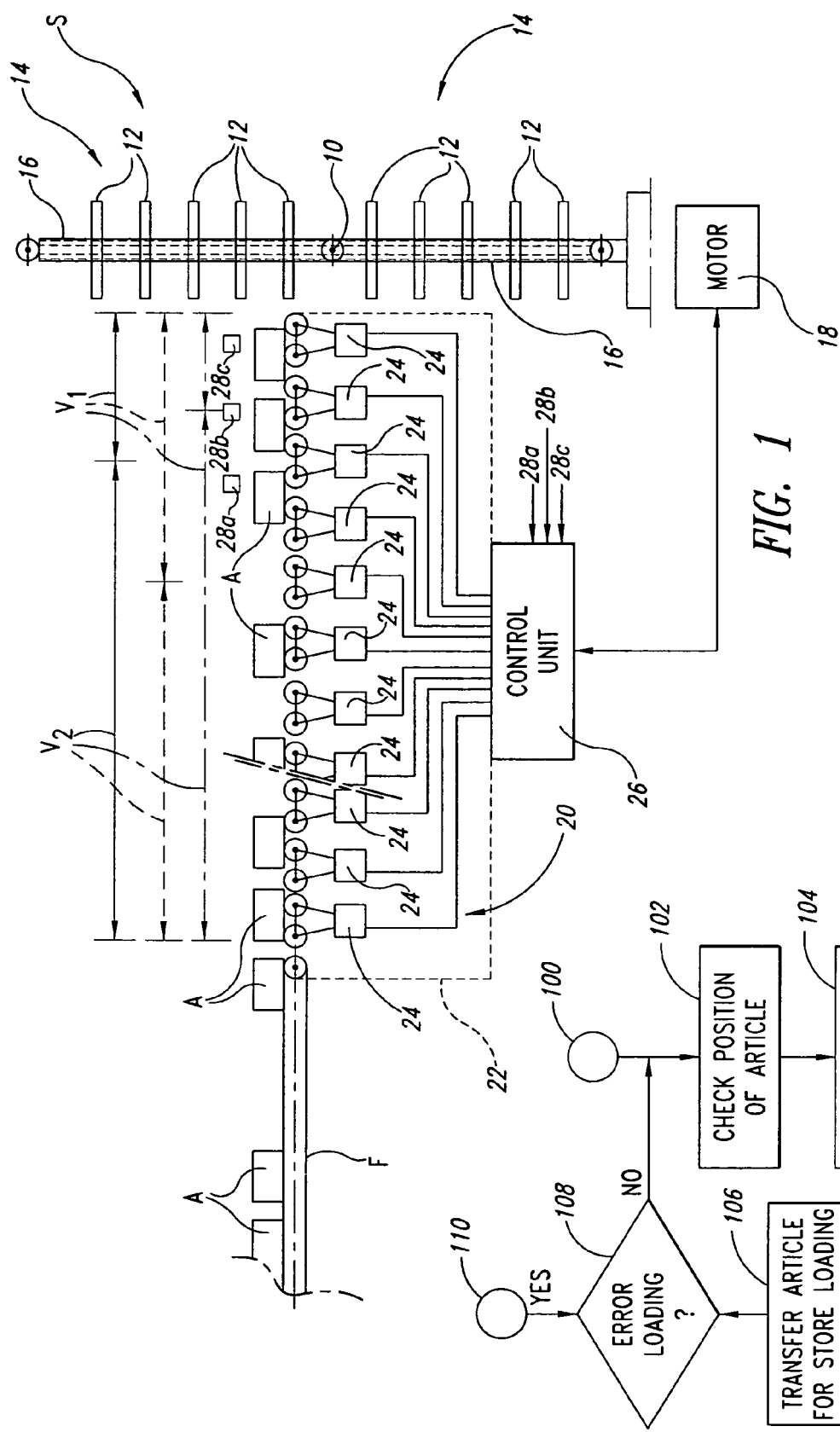

DEVICE FOR CONVEYING PRODUCTS, PARTICULARLY FOR AUTOMATIC PACKAGING MACHINERY, AND CORRESPONDING METHOD OF USE

BACKGROUND OF THE INVENTION

1. Field of the Invention

The present invention relates in general to devices for conveying articles and has been developed with particular attention paid to its possible use in the framework of automatic-packaging plants.

More specifically, the invention has been developed with a view to its possible use together with storage devices comprising a plurality of mobile shelves, with an output area where a plurality of such shelves are substantially set on top of one another and are able to move vertically.

2. Description of the Related Art

Stores of this type are widely known in the prior art, as is documented, for example, by EP-A-0 565 098, FR-A-2 176 324, FR-A-2 521 110, FR-A-2 424 705, GB-A-2 217 170, GB-A-2 336 824, as well as EP-A-0 534 902, to which there corresponds U.S. Pat. No. 5,339,942.

The above documents approach the problem of loading articles arriving from an input conveyor into a store. In different situations of use, the articles to be stored consist of ranks of products aligned at least approximately in a direction transverse to the direction of advance of the products themselves. Each rank is hence to be loaded on a respective shelf of the store.

In these situations of use, it is necessary to meet certain essential requirements, such as, for example, the need to ensure that, at the moment in which each rank of products is transferred from the feed conveyor to the store, a free shelf is present and available in the store to receive the rank of articles that is loaded. This must be done, ensuring that transfer of the ranks of products is as regular as possible.

In some stores the shelves are arranged in groups, each group being comprised in a so-called "gondola" suspended, with a general hunting capability, to a motor-driven chain conveying structure. In this case, it is important to ensure that no undesired phenomena of oscillation of the gondolas are set up in the store that might cause the products in the store to fall.

In the context considered above, it has already been proposed to use mechanisms for following the shelves of the store by means of an oscillating structure of the type described in the document IT-B-1 195 128, in the name of the present applicant.

Albeit proving altogether effective from the operating standpoint, when applied to the context considered herein, the solution described in the above prior document is affected by an intrinsic structural complexity linked to the need to provide the structure that is able to carry out the movement of following the shelves of the store.

BRIEF SUMMARY OF THE INVENTION

One purpose of the present invention is to provide an improved solution for providing products from a conveyor to storage shelves. It is particularly helpful in situations of use in which the flow of the products to be loaded on the shelves of the store (typically consisting of ranks of individual articles aligned in a direction transverse to the direction of advance) will present possible, even rather extensive, discontinuities, but may be used in other situations.

The above situation of use occurs with a certain degree of frequency when the store forms part of a plant (such as, for instance, a plant for packaging confectionery products, such as chocolates), which comprises:

a main conveying line on which there advances, in the form of a substantially continuous mat, a flow of ranks of articles ordered in a direction transverse with respect to the direction of advance; and a certain number of derivation lines that "tap" the individual ranks of products from the main conveying line by causing them to slide in a transverse direction with respect to the main direction of conveyance.

In this case, basically entrusted to the store is the function of operating as accumulation device for gathering the ranks of products that have possibly remained on the main conveying line since they have not been tapped from any derivation line, for example, on account of the fact that said treatment machine associated to one or more of the derivation lines in question is momentarily inoperative.

In such a context of application, the ranks that arrive in succession at the store can therefore be either very close to one another or at quite some distance apart, with a distance between them that may vary in a manner that is difficult to foresee.

According to the present invention, the purpose outlined previously is achieved thanks to a device having the characteristics in the claims that follow. The invention relates also to the corresponding method of actuation.

Basically, the solution described herein envisages the use of a so-called roller track, i.e., a conveyor made up of a certain number of rollers usually set in a horizontal direction and alongside one another so as to define, with their cylindrical surfaces (or, more exactly, with the homologous generatrices of the respective cylindrical surfaces that occupy a top position), a conveying plane for the conveyed articles.

The roller track is used as a temporary storage unit or buffer, with the purpose of receiving rows of products also called ranks that follow one another in a non-uniform sequence, accumulating a certain amount of them, which is then used for feeding in a regular and constant way the shelves of a store set in cascaded fashion, whilst seeking to maintain the speed of advance of the store as constant as possible, ie., avoiding the step like movement of the corresponding shelves, which could lead to hunting phenomena.

The fact that each roller in itself forms an independent body makes it possible, by means of respective power drives, to impart on different portions of the roller track— and virtually on the individual roller—differentiated speeds of rotation.

In particular, it is possible to divide the rollers of the roller track into sets of adjacent rollers, causing the rollers included in a given set to rotate all at the same speed, whilst retaining the possibility of attributing speeds of rotation, hence speeds of conveyance of the articles, that are different from one set of rollers to the other, with the added possibility of displacing selectively the ideal demarcation or boundary line between two sets of adjacent rollers that are moving at different speeds.

For convenience of application, the elementary conveying unit of the roller track is not made up of just one roller but of a pair of adjacent rollers moved by a common power drive.

BRIEF DESCRIPTION OF THE DRAWINGS

The invention will now be described, purely by way of non-limiting example, with reference to the annexed drawings, in which:

FIG. 1 is a schematic side elevation of a device according to the invention, represented in a possible configuration of use in association with a store for storage of products in a packaging plant; and FIGS. 2 and 3 are two flowcharts illustrating a possible mode of operation of a device according to the invention.

DETAILED DESCRIPTION OF THE INVENTION

Figure 3:
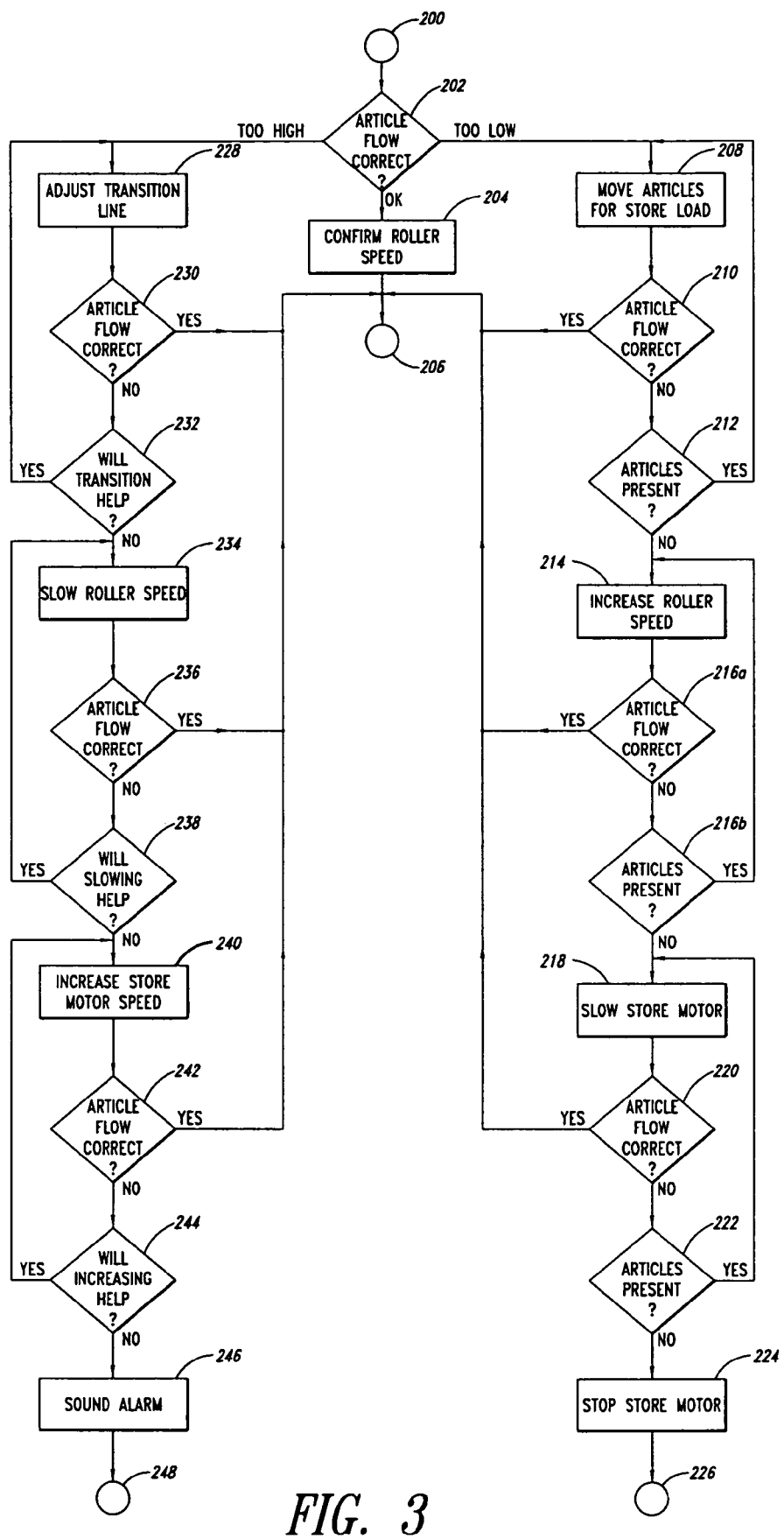

In FIG. 1, the reference S designates a so-called store which can be used for temporary accumulation of articles or products, for example in the context of an automatic-packaging plant.

In a typical example of application, the store may be a store designed to be used in the context of a plant for automatic packaging of confectionery products, such as, for instance, bars of chocolate or similar products, designated by A.

The articles A can be made up either of individual products or, in a typical example of application of the solution according to the invention, of ranks of individual products aligned in a transverse direction with respect to the direction of advance towards the store S.

For immediate reference, if the representation provided in FIG. 1 is considered, the aforesaid direction of conveyance in the plane of the drawing is shown with a direction of advance of the articles A from left to right. The ranks of products that make up the articles A consist of products such as, for example, chocolates aligned in ranks, each rank comprising a plurality of products aligned in a direction perpendicular to the plane of the drawing.

In particular, FIG. 1 illustrates the input section of the store S.

At said input section, the conveying structure of the store S, which usually consists of a motor-driven chain conveyor, comprises two branches of chain 10, which extend vertically and support a plurality of shelves 12, set on top of one another, on which articles A are to be loaded.

In a preferred way, the shelves 12 are grouped together into structures 14, commonly referred to as "gondolas." Each gondola usually comprises a certain number of shelves 12 (for example, four or five shelves), which are kept on top of one another and are fixed together by two vertical uprights 16.

At the two sides of each gondola 14, the two uprights 16 are connected at their top ends to one of the chains 10 according to a general structure which enables free hunting thereof, the aim being to allow the shelves 12 to maintain a general horizontal orientation even when the respective driving chains 10 describe non-vertical paths.

The chains 10 are in fact comprised in a conveying system (not illustrated as a whole), which usually presents a general loop-like development in such a way as to enable the shelves 12 to follow a path comprising:

an active stretch which extends from the loading section or input section S, schematically represented in FIG. 1, towards an unloading section of the store, which usually presents quite a tortuous path comprising a plurality of bends in the top part of the store S; and a passive stretch or return stretch, which extends from the output or unloading end to the input end, which usually also describes a tortuous path in the lower part of the store.

The above description corresponds to well-known constructional criteria. The construction and operation of store S, with shelves 12 and gondolas 14 is well known in the art and can be derived also from several of the various examples of prior art cited in the introductory part of the present description and, consequently, do not call for a detailed description herein.

Described specifically herein is a group or assembly 20 set between a feed conveyor F and the store S for the purpose of ensuring that the articles A, arriving on the conveyor F in a flow characterized by the possible presence of more or less extensive discontinuities originating in positions that are not known a priori, may be loaded in a regular and orderly way on the shelves 12 of the store S. The above is obtained by causing the conveying structure of the store S, driven by a motor 18 and comprising the chains 10, to be actuated in a way that is as regular as possible, avoiding sudden accelerations and decelerations and rather, whenever possible, maintaining a constant speed of operation.

The device 20 is configured basically as a roller track, i.e., as a structure comprising a sturdy base 22, which supports a plurality of rollers. The latter are set in a horizontal direction and alongside one another, with respective axes of rotation oriented in a direction transverse with respect to the direction of advance of the articles in order to obtain on top of the roller track itself a horizontal plane of conveyance of the articles A, which extends from the output end of the conveyor F up to the proximity of the ideal vertical plane in which the shelves 12 of the store S move.

The roller track 20 is a fixed structure in the sense that, with the exception of the capability of the rollers that compose it to rotate about their respective axes, the base 22 and the set of rollers supported thereby describe movements of hunting or of following, even just at a local level, the movement of the shelves 12 of the store S.

Purely by way of example, without, however, meaning to limit in any way the sphere of protection of the invention, the roller track 20 may typically comprise some tens of rollers (usually from 40 to 80 rollers), preferably ordered in sets of two, with each set forming an elementary conveying unit. The rollers of the roller track 20 are hence arranged in pairs of adjacent rollers with the rollers of each pair driven in rotation (of course at the same speed) by a respective motor 24. Transmission of motion from each motor 24 to the rollers is obtained by means of a chain transmission or a cogged-belt transmission of a known type.

Once more purely by way of example, the rollers of the roller track 20 may have a diameter of 20 mm, with the respective horizontal axes spaced by a pitch of 23 mm, which means that each elementary conveying unit making up the roller track has a length of approximately 46 mm.

As has already been said previously, there may be provided, and hence are included within the context of the present invention, both devices in which each roller of the roller track has associated thereto a respective driving motor and solutions in which there are more than two rollers driven by an individual motor 24.

The solution described herein (as has been said, purely by way of example) has been adopted with particularly satisfactory results for treating products having a length of the order of a hundred millimeters.

In the diagram of FIG. 1, the reference number 26 designates a control unit (such as, for example, a so-called programmable logic controller (PLC) or an equivalent device), which is able to control in a coordinated way operation of the motors 24 of the roller track and of the motor 18 which moves the shelves 12 of the store S.

Usually, the unit 26 also controls movement of the feed conveyor F. The corresponding details are not, however, of specific importance for the purposes of an understanding and implementation of the invention. The same considerations apply also as regards the choice of which of the various power drives comprised in the plant schematically illustrated in FIG. 1 has to function as "master" drive. For this reason, generic reference has been made to the possibility of obtaining operation of the various power drives that is "coordinated" by the unit 26.

The fact that the rollers of the roller track 20 are arranged in elementary conveying units (illustrated herein as being made up of two rollers) enables the unit 26 to divide the conveying plane of the articles A, which is ideally defined by the top generatrices of the rollers of the roller track, into at least two sets of rollers, each set comprising rollers that move at the same speed and there being the possibility of imparting different speeds on the two different sets.

For example, FIG. 1 refers to three possible partitions of the aforesaid plane of conveyance of the articles.

The solution illustrated at the top with a solid line relates to a case in which the first three conveying units (i.e., the first three sets of two rollers each), considered starting from the downstream end of the roller track 20, i.e., from the end set facing the store S, move at a speed $v_1$, whilst all the other rollers move in a coordinated way-at a speed $v_2$.

Immediately below, illustrated with a dashed line is a situation in which the demarcation or boundary line between the two sets of rollers that move at the speeds $v_1$ and $v_2$ has been displaced backwards by an amount equal to the extent of two conveying units. In this case, in fact, it is the five conveying units (five sets-of two rollers) adjacent to the store S that are moving with the speed $v_1$, whilst the other rollers are moving at the speed $v_2$.

Further down, illustrated with a dashed line is a situation in which the aforesaid demarcation line has been displaced further downstream, i.e., nearer to the store S. In this case, in fact, two elementary conveying units (i.e., two sets of two rollers each) are moving at a speed $v_1$, whilst all the other rollers of the roller track are moving at a speed $v_2$.

The operating scheme described can be implemented with extreme flexibility, even irrespective of the relation existing between $v_1$ and $v_2$. In particular, the aforesaid demarcation or separation line may be displaced throughout the longitudinal extent of the roller track 20.

Again, the modes of use described are not in any way limited to the possibility of defining, in the framework of the roller track 20, just two sets of rollers that move at different speeds. It will, in fact, be appreciated (reference will be made to this possibility in the remainder of the present description) that in the framework of the roller track 20, for example, in a position corresponding to the upstream end of the roller track itself facing the conveyors F, it is perfectly possible to define a set of rollers that move all at a speed $v_3$, which is different both from $v_1$, and from $v_2$.

Even though this does not in itself constitute a constraint, in the sequel of the present description constant reference will be made to a situation in which, typically, $v_2$ is greater than $v_1$, since it is moreover necessary to take into account the fact that usually the set of rollers that is right up against the store S does not move at a constant speed. The said set of rollers may, in fact, speed up or slow down, for example, according to whether the article located in the most distal position, and hence the next one to be loaded on the store, finds itself too late or too early for the appointment with the corresponding shelf of the store S.

The quantity that characterizes the movement of the rollers comprised in the roller track 20 is, in actual fact, the speed of rotation of each roller about its axis. Said speed of rotation is, however, directly correlated, through the radius of the roller, to the speed ($v_1$ or $v_2$) that the roller itself is capable of imparting on an article A that travels on the roller itself. For this reason, in the ensuing description, the quantities such as $v_1$ and $v_2$ will be referred to simply as "speed of movement of the rollers".

The criteria with which the unit 26 distributes the speeds of movement among the various motors 24 (in practice, the modalities with which the unit 26 determines the position of the demarcation or boundary line between the set of rollers that moves at a speed $v_1$ and the set of rollers that moves at a speed $v_2$) are determined by the unit 26 in accordance—or, rather, in a coordinated way—with the speed of advance of the motor 18 and with the detection signals coming from photocells designated by 28a, 28b, 28c.

The latter detect the presence of the articles A on the roller track 20 and, in particular, in a position corresponding to the conveying unit of the roller track 20 itself located downstream, in the proximity of the store S.

Photoelectric cells or sensors of a similar type are usually provided also in other positions of the roller track 20 for ensuring regular operation of the roller track itself. In any case, the ensuing description will draw attention primarily to the detection of the presence of products in the proximity of the downstream end of the roller track 20.

Basically, the device 20 described herein operates according to the following general criteria:

a) synchronizing the movement of the downstream end of the roller track 20 in such a way that, whenever a shelf 12 of the store S available for loading articles A approaches the roller track 20, on said end set downstream there will be available an article A to be transferred onto the shelf 12 itself; and b) ensuring that, at the aforesaid end set downstream of the roller track there will always be available an accumulation (or buffer) of articles A such as to enable the condition a) referred to above to be met.

Of course, the device 20 is aimed at ensuring that the conditions appearing above are met in a normal situation of operation, namely when the mean flow of articles A arriving at the store on the conveyor F and the capacity of the store S for receiving said articles are commensurate with one another. It is, in fact, evident that, in the event of a scarcity or even exhaustion of the flow of articles, the function of the store fails, and the store S itself, as well as the device 20, are stopped.

In a complementary way, if the capacity of the store S for receiving articles is not such as to enable receipt of the flow of articles arriving, the unit 26 intervenes, setting under way actions directed at inducing arrest of the flow of the articles A.

The flowchart of FIG. 2 refers basically to the steps that implement co-ordination of the speed of movement of the store S driven by the motor 18 and the speed of the downstream portion of the roller track 20—whatever the number of rollers included in said portion of roller track.

Thus, starting from an initial step 100, in a step 102, the unit 26 checks (via known means—not specifically illustrated, which may, for example, consist of a photoelectric cell or an optical barrier or else a position sensor associated to the chain 10 or to the motor 18) in what position the shelf 12, on which the "next" article is to be loaded, is located at that particular moment.

Usually, the movement of the shelves 12 takes place from the bottom upwards. It will moreover be appreciated that, whereas the shelves 12 included in each gondola 14 are situated at constant distances apart, between the bottom shelf of a gondola and the top shelf of the underlying gondola there is usually present a space that is slightly greater than the distance separating the shelves 12 included in each gondola 14.

Once the said detection has been made (note that, in general, the shelves 12 move at a constant speed), in a step 104 the unit 26 adjusts the speed $v_1$, of the output stretch of the roller track 20 so as to ensure that, in a subsequent step 106, the article A that occupies the position further downstream on the roller track 20 will be transferred in a reliable and precise way onto the shelf 12, without arresting movement of the store S.

In a step 108, the unit 26 checks that there have not arisen, as a result of execution of the steps that will be described in what follows with reference to the flowchart of FIG. 3, indications such as to require arrest of the system.

If the check made in step 108 yields a negative result, the cycle of steps described previously is repeated.

If, instead, the check yields a positive result, the unit 26 will stop (step 110) the roller track 20 and the elements with which the latter co-operates.

The operating steps described with reference to FIG. 2 have the purpose of enabling regular transfer of the articles A between the ends located downstream of the roller track 20 and the shelves 12 of the store S.

The various steps referred to in the flowchart of FIG. 3 have, instead, the purpose of causing the unit 26 to ensure that, at the output ends-of the roller track 20, there will always and in any case be available at least one article A ready for being transferred onto a shelf 12 of the store S which advances upwards, approaching the downstream end of the roller track 20.

In order to illustrate the execution of the steps of the flowchart of FIG. 3, it will be assumed that the plant is running in full operating conditions, in which the downstream end of the roller track 20 is housing a buffer, which comprises a given number of articles A, for example three articles received on an end portion of the roller track 20 comprising a given number of rollers (for example, six rollers ordered in three pairs), which move at a speed $v_1$. As has already been said, this value of speed must not be interpreted in an absolute sense, since in actual fact it may constitute the maximum/mean value of the aforesaid nominal speed, the reason being, as the steps of the flowchart of FIG. 2 are followed, that the unit 26 imposes variations in said speed, which are aimed at ensuring proper synchronization with the movement of the shelves 12 of the store S.

It will moreover be assumed that all the other rollers of the roller track 20, included in the "upstream" portion of the roller track 20 itself, i.e., the portion facing the conveyor F, move in such a way as to ensure a conveying speed $v_2$, that is at least marginally higher than $v_1$.

The absolute values $v_1$ and $v_2$ are chosen in advance so as to be commensurate with the flow of articles A in the conveyor F and with the speed of movement of the shelves 12 of the store S.

If we now examine the flowchart of FIG. 3, after a starting step 200, in a selection step 202 the unit 26 checks whether, in the downstream section of the roller track 20, there is present an accumulation (or buffer) of articles that is sufficient to ensure proper execution of the operations of transfer exemplified in the flowchart of FIG. 2.

If the above check yields a positive result, in a step 204 the unit 26 simply confirms the previous configuration of the roller track, both as regards the values of the speed of advance of the rollers and as regards the position of the demarcation line separating the two portions of rollers that travel at the speed $v_1$ (portion downstream) and at the speed $v_2$ (portion upstream).

The process is completed in a final step 206 after the unit 26 sets itself for repeating the operation of verification. This is usually driven at a speed that is commensurate with the speed of advance of the articles A.

The verification operation performed in step 202 (basically conducted according to the signals generated by the photocells 28a, 28b, 28c that monitor the presence of articles A on the downstream stretch of the roller track 20) may, however, conclude with two other different results, recognizing, for example, that the level, of filling of the buffer is:

too low, with the consequent risk that, at the downstream end of the roller track 20, there will be the absence of an article A that is to be transferred onto a shelf 12 of the store S; or too high, with the consequent risk that, on the roller track 20, there will be formed an excessive accumulation of articles A.

Once it is detected that the buffer is at too low a level, in a step 208 the unit 26 makes a first attempt aimed at favoring filling of the buffer itself.

This step basically consists in displacing further downstream the ideal line of separation between the portion of rollers that moves at the speed $v_1$ and the portion of rollers that moves at the speed $v_2$. Since, as has been seen, this second speed is in general higher than the speed $v_1$, with which the articles advance on the end stretch of the roller track 20, the displacement of the aforesaid ideal line of separation downstream has the effect, so to speak, of accelerating the flow of articles A towards the ends.

In a step designated by 210, the unit 26 checks whether the said intervention has been successful.

If it has, the system moves on to the final step 206.

Otherwise, the system moves onto another testing step designated by 212, in which the unit 26 checks whether it is possible to repeat the intervention of control performed previously, ie., to shift further downstream the ideal line of demarcation between the downstream portion of rollers, the upstream portion of rollers, which moves at the speed $v_2$. In the case where said intervention is possible, the unit 26 returns prior to step 208.

Once the possibilities of intervention in the direction of displacement further downstream of the line of separation of the two portions of rollers have been exhausted without succeeding in re-establishing a satisfactory buffer level, the unit 26 implements a further intervention of compensation, which basically involves increasing the speed $v_2$ at which the articles A advance in the upstream portion of the roller track 20.

This intervention, which is executed in a step designated by 214, may involve either the said portion of rollers set upstream as a whole or even just one part of the rollers included in said upstream portion, for example a portion of rollers located in the proximity of the upstream end of the roller track 20, close to the output end of the conveyor F.

The above mode of intervention is implemented by the unit 26 by intervening accordingly on the motors 24 that drive the rollers included in said portion, which is thus made to move in such a way as to transfer the articles A at a speed $V_3$ which is generically higher than the speed $v_2$.

After performing the intervention exemplified in the step 214, in a step 216a the unit 26 checks whether the intervention has led to reconstituting a sufficient level of filling of the buffer.

If the result of the test is positive, operation of the unit 26 moves on again to step 206.

If the result of step 216a is negative, in a step 216b the unit 26 checks whether it is possible to carry out again another intervention for increasing the speed of flow of the articles to the downstream portion of the roller track. If it is possible, the further intervention is performed according to the procedure seen previously.

If the result of step 216b is negative (generic indication of the fact that the flow of incoming articles has undergone a considerable reduction in intensity), the unit 26 intervenes on the motor 18 to reduce the speed of movement of the shelves 12 of the store, causing the latter to advance more slowly towards the downstream end of the roller track 20.

Also the step 218 is followed by two testing steps.

The first step, designated by 220, is aimed at establishing whether the intervention made in step 218 has led to reconstituting a sufficient level of filling of the buffer. Also in this case, if the result is positive, operation of the unit 26 moves on to step 206.

If the result is negative, in a testing step 222 the unit 26 checks whether it is possible to make further interventions for reducing the speed of movement of the store S. If this is possible, operation of the unit 26 moves on again prior to step 218.

If it is not possible, since the flow of incoming articles A has probably been exhausted, the unit 26 stops the store S (this occurs in a step designated by 224) and moves on to a final step designated by 226.

In the case where the verification step designated by 202 indicates that the level of filling of the buffer located at the downstream end of the roller track 20 tends to be too high, the unit 26 implements a series of interventions which are basically complementary to the ones just described.

In particular, in a step designated by 228, as possible first intervention for reducing the level of filling of the buffer, the unit 26 displaces further upstream the line of separation between the portion of rollers that convey the articles A at the speed $v_1$ and the portion of rollers that convey the articles A at the speed $v_2$.

Since $v_2$ is at least marginally higher than $v_1$, this intervention corresponds in practice to "slowing down" the speed of inflow of the articles A towards the downstream section of the roller track 20.

The step 228 is followed by two testing steps 230 and 232, in which a check is made to see whether the intervention has been successful (in which case operation of the unit 26 moves on to step 206), or else unsuccessful.

In this latter case, in step 232, the unit 26 checks whether it is possible to carry out further interventions aimed at displacing further upstream the ideal line of demarcation between the two sets of rollers of the roller track. Should this attempt be possible (positive result in step 232), the operation of the unit 26 moves again prior to step 228.

If the intervention has not been effective, in a step 234 the unit 26 implements an intervention of correction of the speed, which is based essentially upon a reduction of the speed $v_2$.

Also in this case, in a step 236 a check is made to see whether the intervention has been effective. If it has, operation of the unit 26 moves on again to step 206.

If it has not, in a step 238 a check is made to see whether it is possible to make other similar interventions. If it is possible, the operation returns prior to step 234. If not, the unit 26 moves on to step 240, in which it intervenes on the motor 18 so as to increase the speed of movement of the shelves 12 of the store, in practice in order to increase the capacity of absorption of the articles A by the store S. In this case, in a step 242 a check is made to see whether the intervention has been successful (in which case the unit 26 moves on to step 206) or not (in which case the unit 26 moves on to a further testing step 244 to check whether it is possible to implement further interventions for increasing speed of movement of the store S). If it is possible, operation of the unit 26 moves on again prior to step 240.

If it is not possible, the unit 26 realizes that the operation of the system is proceeding in conditions in which the incoming flow of articles A is unlikely to be absorbed by the store S.

In a step 246, a corresponding alarm intervention is implemented (for example, arrest of the plant with issuing of a warning signal to the operators), and the system moves on to a final step designated by 248.

Both in the case of interventions performed when the level of the buffer is too low and in the case of interventions performed when the level of buffer is too high, the actions of correction of the speed of movement of the articles on the roller track (steps 214 and 234 of the flowchart of FIG. 3) could be exchanged with the steps 218 and 240 of correction of the speed of movement of the store S.

Usually, it is preferable for the interventions on the speed of movement of the roller track to be carried out with priority in respect to the interventions of modification of the speed of movement of the store S, since, as indicated in the introductory part of the present description, the solution described herein seeks to minimize the possible interventions of modification of the speed of movement of the store S, which might induce (it they were to be performed in an excessively brusque way) undesired phenomena of hunting of the gondolas 14 of the store S.

For this reason, also the step of starting-up of the system described is performed gradually.

For instance, at start-up of the system illustrated in FIG. 1, it is assumed that initially the roller track 20 is empty, with the store S stationary.

The first article A to arrive starting from the conveyor F along the roller track 20 is directly conveyed onto a shelf 12 aligned with the roller track 20 itself. The article A immediately following will, instead, traverse the roller track 20 and stop at the downstream end of the roller track itself and, as soon as it has received the rank in this position, will stop (zero speed).

When a minimum amount of articles A is stored on the roller track 20, the store S is started up gradually, with an acceleration such as to avoid the occurrence of any oscillation that might jeopardize the stability of the articles A deposited on the shelves 12.

Each shelf 12 that presents itself in the proximity of the downstream portion of the roller track 20 will hence "ask" the roller track for an article A. Said article will be supplied by the roller track itself starting from its downstream end, said event entailing a displacement downstream by one step of all the ranks A that are accumulating.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principles of the invention, the details of implementation and embodiments may vary widely with respect to what is described and illustrated herein, without thereby departing from the scope of the invention, as this is defined by the ensuing claims.

The invention claimed is:

1. A system for conveying articles, comprising:
   a storage device, which comprises a plurality of mobile shelves with an input section, where a plurality of said shelves are substantially set on top of one another and are able to move in a vertical direction; and
   a device for conveying articles, which is able to receive a flow of incoming articles to be transferred onto the shelves of said storage device, the device for conveying articles including:
   an array of rollers set alongside one another so as to define, by homologous generatrices, a plane of conveyance of said articles;
   a plurality of motor-driven units for said rollers, each motor-driven unit being able to bring about rotation of at least one respective roller of said array; and
   a control unit, which acts on said motor-driven units and is able to control said motor-driven units with a speed that is selectively determined in such a way that said motor-driven units are divided into at least one first set of motor-driven units, with associated thereto a respective first set of rollers, which move in at least one first speed and at least one second set of motor-driven units with associated thereto a respective second set of rollers, which move in at least one second speed, said respective first and second sets of rollers being contiguous to one another along an ideal demarcation line, with said control unit being able to assign each motor-driven unit selectively to one or the other of said at least one first set and said at least one second set of motor-driven units so as to displace selectively said ideal demarcation line in a direction of advance of said articles on the array of rollers, wherein in which said at least one first respective set of rollers and said at least one second respective set of rollers constitute, respectively:
   a first conveying structure for receiving said flow of incoming articles, and
   a second conveying structure for transferring said articles from said conveying device to the shelves of said storage device, a speed of the first and second conveying structures being independently controllable.

2. The system according to claim 1, further comprising a plurality of sensor elements for detecting a presence of said articles at least in a position corresponding to said at least one respective said first set of rollers.

3. The system according to claim 1, further comprising a control unit configured for varying selectively a quantity of one of the following:
   a speed of movement of the shelves of said storage device;
   the speed of movement of the first conveying structure;
   the speed of movement of the second conveying structure; and
   a position of a demarcation line between the first and second conveying structures in order to:
   form and keep on said at least one respective second set of rollers an accumulation of said articles to be transferred onto the shelves of said storage device, and
   transfer, in a way synchronized with the movement of articles, from said accumulation to the shelves of said storage device.

4. A method for actuating a system for conveying articles, the system including a storage device, which comprises a plurality of mobile shelves with an input section, where a plurality of said shelves are substantially set on top of one another and are able to move in a vertical direction, and the system including a device for conveying articles, which is able to receive a flow of incoming articles to be transferred onto the shelves of said storage device, the device for conveying articles including an array of rollers set alongside one another so as to define, by homologous generatrices, a plane of conveyance of said articles, the device for conveying articles also including a plurality of motor-driven units for said rollers, each motor-driven unit being able to bring about rotation of at least one respective roller of said array, the device for conveying articles further including a control unit, which acts on said motor-driven units and is able to control said motor-driven units with a speed that is selectively determined in such a way that said motor-driven units are divided into at least one first set of motor-driven units, with associated thereto a respective first set of rollers, which move in at least one first speed and at least one second set of motor-driven units with associated thereto a respective second set of rollers, which move in at least one second speed, said respective first and second sets of rollers being contiguous to one another along an ideal demarcation line, with said control unit being able to assign each motor-driven unit selectively to one or the other of said at least one first set and said at least one second set of motor-driven units so as to displace selectively said ideal demarcation line in a direction of advance of said articles on the array of rollers, wherein in which said at least one first respective set of rollers and said at least one second respective set of rollers constitute, respectively a first conveying structure for receiving said flow of incoming articles, and a second conveying structure for transferring said articles from said conveying device to the shelves of said storage device, a speed of the first and second conveying structures being independently controllable, the method comprising:
   constituting, on said at least one second respective set of rollers, an accumulation of said articles;
   applying to the motor-driven units of said at least one first set of rollers a speed of movement such as to cause the articles conveyed by said respective second set of rollers to move along said second respective set of rollers with a speed that is at least marginally higher than a speed of movement imparted on the articles which are on said respective set of rollers by motor-driven units of said first set;
   controlling a speed of movement of at least one of the motor-driven units of said at least one second set of rollers so as to transfer to the shelves of said storage device articles from said accumulation;
   monitoring a presence of articles in said accumulation;
   monitoring the presence of articles in said accumulation by detecting conditions in which a number of articles in said accumulation is insufficient and sufficient, respectively, for ensuring said transfer with said synchronized sequence; and
   selectively varying a position of said ideal demarcation line, displacing said line towards said storage device and away from said storage device when the number of articles in said accumulation is insufficient and excessive, respectively.

5. The method according to claim 4, further comprising increasing the speed of movement of the motor-driven units of said at least one second set of rollers when the number of articles comprised in said accumulation is insufficient.

6. The method according to claim 4, further comprising increasing the speed of movement of the motor-driven units of said at least one second set of rollers when the number of articles comprised in said accumulation is excessive.

7. The method according to claim 4, further comprising reducing the speed of movement of the shelves of said storage device when the number of articles comprised in said accumulation is insufficient.

8. The method according to claim 4, further comprising increasing the speed of movement of the shelves of said storage device when the number of articles comprised in said accumulation is excessive.

* * * * *

UNITED STATES PATENT AND TRADEMARK OFFICE
CERTIFICATE OF CORRECTION

| | | |
|---|---|---|
| PATENT NO. | : 7,032,736 B2 | Page 1 of 1 |
| APPLICATION NO. | : 10/799287 | |
| DATED | : April 25, 2006 | |
| INVENTOR(S) | : Dario Guidetti et al. | |

It is certified that error appears in the above-identified patent and that said Letters Patent is hereby corrected as shown below:

Title Page
Foreign Application Priority Data (30) "03425169" should read as --03425169.4--.

Signed and Sealed this

Seventh Day of November, 2006

JON W. DUDAS
*Director of the United States Patent and Trademark Office*